May 20, 1941.    J. M. AUFIERO    2,242,337
HEATER
Original Filed June 15, 1936
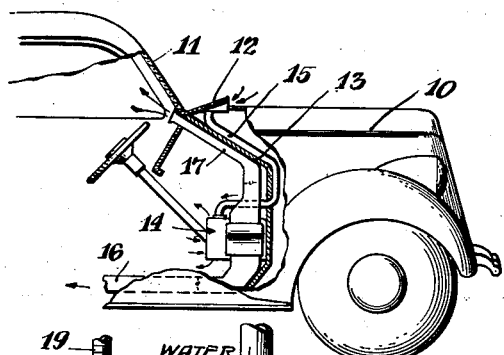
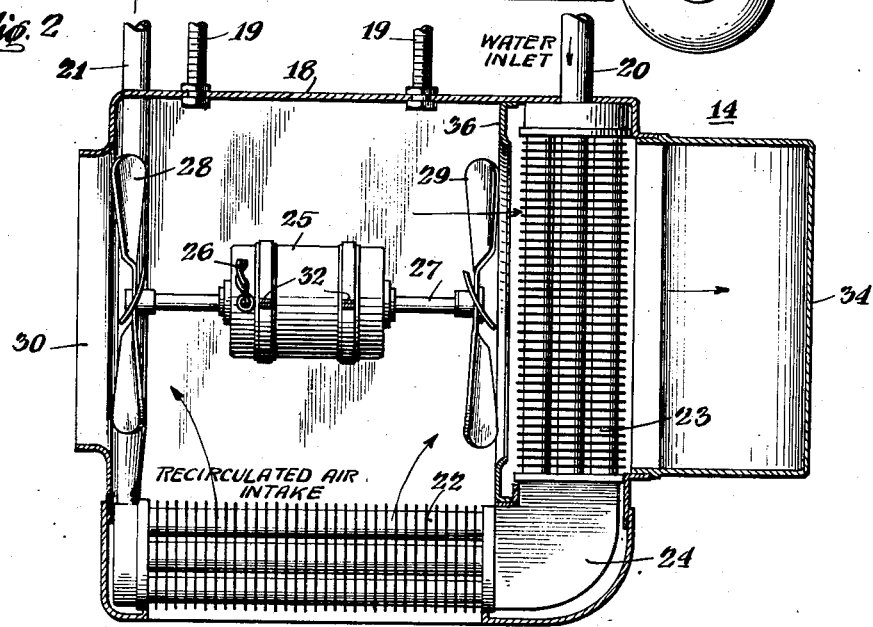
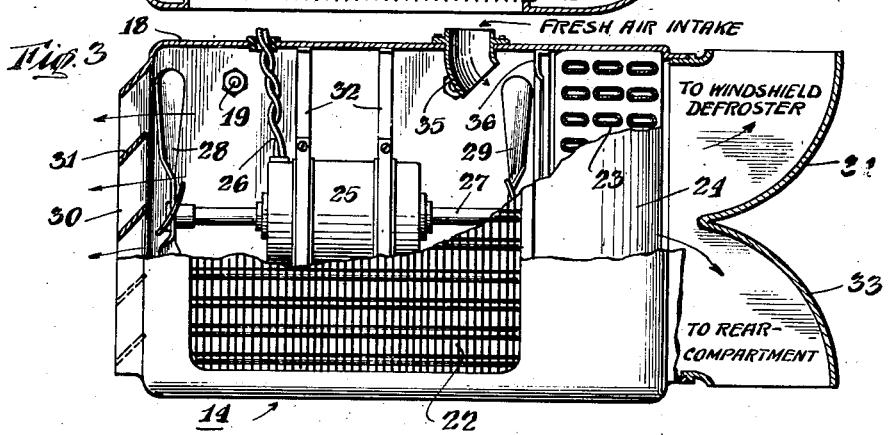
INVENTOR
John M. Aufiero
BY
ATTORNEYS Patented May 20, 1941

2,242,337

UNITED STATES PATENT OFFICE 2,242,337

HEATER

John M. Aufiero, Brooklyn, N. Y., assignor to E. A. Laboratories, Inc., Brooklyn, N. Y., a corporation of New York Original application June 15, 1936, Serial No. 85,250. Divided and this application August 16, 1939, Serial No. 290,393

6 Claims. (Cl. 257—137)

This invention relates to a structurally and functionally improved heater, the present application being a division of my prior application for United States Letters Patent which was filed on June 15, 1936, and which, on July 16, 1940, issued under Patent No. 2,197,172.

It is an object of the invention to furnish a unit of this character which will be of particular value when employed in association with a motor vehicle and in similar installations for the purpose of warming the interior of the vehicle or any other corresponding space.

A further object is that of providing a heat exchange device which is primarily intended for the purpose of heating but which may—under certain circumstances—be employed to advantage in connection with the cooling of a designated space. When so employed in its preferred association it may be coupled to the engine cooling system of the vehicle for the purpose of having heated fluid from the latter pass through its body in order to warm air which in turn passes in heat exchange contact with such heater body. When so installed the unit will function efficiently and with freedom from all difficulties and needs of replacement in order to deliver a maximum volume of heated air to any desired point.

Another object is that of furnishing a device of this type which may operate to recirculate and condition air within a given space; to condition fresh air and to distribute the same, and/or else to cause a conditioning and recirculation of a mixture of both fresh and recirculated air. Moreover, by means of this invention a structure is furnished which will result in an extremely efficient distribution of air not alone generally to the interior of a space, but also to specific locations such as points adjacent the windshield of the vehicle, for example, the rear compartment of the same, etc.

Still another object is that of furnishing a device of this type which will embody relatively few parts, each individually rugged and simple in construction, these parts being capable of ready assemblage, to furnish a unit of this type which may be simply installed and which may moreover be sold at a nominal figure.

With these and other objects in mind, reference is had to the attached sheet of drawings illustrating one practical embodiment of the invention, and in which:

Fig. 1 is a somewhat diagrammatic, partly sectional side view of the forward portion of a motor vehicle with the heat exchange unit applied thereto;

Fig. 2 is a horizontal sectional view of one form of heater constructed in accordance with the teachings of the present invention; and Fig. 3 is a vertical transverse section of the unit as shown in Figure 2.

Referring primarily to Fig. 1 in which the unit has been shown in its preferred association, it will be seen that the numeral 10 indicates the forward end of a vehicle provided with a windshield 11, a cowl ventilator 12 and a dash 13. The heat exchange unit has been generally indicated at 14 and as shown a tube 15 may extend from the ventilator 12 to the unit 14, while tubes 16 and 17 may be connected to unit 14 and extend respectively to the rear compartment of the vehicle and to a point adjacent the windshield 11 of the same.

Moreover, and in accordance with technique well understood by those skilled in the art, the heater is connected by tubes (not shown) to for example the cooling system of the motor (also not shown) within the forward portion 10 of the vehicle. Consequently heated fluid from such motor will circulate through the heater and be recirculated back to the cooling system; it being understood that various types of thermostatic valves, fluid cut-offs, etc. may be interposed in the circuit.

The heater per se may include, as shown in Figs. 2 and 3, a casing 18 conveniently formed of metal and provided with bolts 19 or any other suitable structure by means of which it may be secured to the dash 13 of the vehicle. Moreover the tubes through which the heater is connected to the circulating system have been respectively indicated at 20 and 21 and these tubes are coupled to the headers of cores 22 and 23. The cores may be arranged in series with each other by being coupled through an elbow member 24. Obviously any other suitable form of connection may be employed and likewise the core elements themselves may include any desired construction presenting interstices through which air may flow.

Arranged within casing 18 is an air impelling structure which may include, as shown, a motor 25 connected through wires 26 to a control by means of which suitable operation of the motor may be effected. Coupled to the motor shaft 27 is an air impeller structure which may include a pair of radial blade type fans 28 or 29 arranged so that one absorbs the thrust of the other.

With the parts arranged as shown, air is drawn through core 22 and distributed through core 23 as well as through an opening 30 formed in the casing 18. This opening may be guarded by deflectors or louvers 31 and, as will be observed especially in Fig. 3, the air impelling structure together with the motor may be supported within the casing by brackets or straps 32.

Beyond core 23 the casing may mount a fitting which can include branches 33 and 34, the former being for example coupled to tube 16, while the latter may be connected to tube 17. Additionally extending through the casing wall is an intake 35 which may be coupled to tube 15 to distribute to the interior of the casing any desired quantity of fresh air. Moreover, as will be understood various means may be associated with the several parts in order that the quantity of air flowing through the various tubes and/or discharged through the several openings or fittings, may be regulated. Such means has not been shown in that the installation of the same will be obvious and may take numerous different forms.

Finally, it will be noted that the parts of the casing adjacent the opening 30 may be modified and embody a configuration such that they provide in effect a shroud plate structure adjacent the fan 28. A shroud plate 36 is disposed adjacent fan 29 in order to assure of a proper flow of air through the fitting. It will be seen that the shroud plate 36 in conjunction with casing 18 in effect provides a housing for the air discharged by impeller 29 and within which a plenum effect may occur.

Thus, it will be understood that as afore brought out, air is drawn through that opening of the casing adjacent which core 22 is disposed and this air is thus conditioned by the core. The air flow results of course incident to the operation of the air impelling structure. One of the impellers simply discharges the air through the outlet opening 30 of the casing, while the other of the same causes a radial or tangential flow of air with respect to the casing and in the form of columns through the fitting embracing the branches 33 and 34. In such flow and incident to the provision of core 23, the air is further conditioned. Thus separate impelling means are furnished for different purposes, i. e., generally warming the interior of the space and directing warmed or conditioned air to specific locations and an extremely efficient form of unit is thus provided Viewed from another aspect, it will of course be noted that the core sections 22 and 23 in effect form one continuous air conditioning unit. Through one area of this unit air is sucked by a person of the impelling means and through another area of the unit a portion of the area is blown by the impelling means. In connection with the latter flow it will be understood that a certain amount of the air blown through the core need not necessarily have been previously sucked through the core. This is because the inlet 35 is generally shaped to assure a flow of air towards the impeller 29. However, with the valve means or dampers (not shown) associated either with the branches 33 and 34 or the tubes extended therefrom closed, it will be apparent that no air will be discharged through the core section 23. Under such circumstances all air drawn through core section 22 or fitting 35 will, of course, be distributed through opening 30.

Finally, it will be understood that by means of the present structure, an operator is able to fully control the operation of the unit under varying climatic conditions. In other words, with no air flowing through tube 15, all air is recirculated and distributed as desired. With tube 15 opened partially, the recirculated air is diluted by a certain amount of fresh air, while if a greater volume of air is permitted to flow through branch 35, the recirculated air is further diluted. Also, as is apparent, if no fluid flow occurs through pipes 20 and 21 and a flow of air is permitted through tube 15, fresh air will be distributed within the interior of the vehicle.

Thus among others the objects of the invention as afore described are achieved. Obviously, numerous changes in construction and rearrangement of the parts might be resorted to without departing from the spirit of the invention as defined by the claims.

I claim:

1. An automobile heater including a casing formed with an inlet opening and a plurality of outlet openings, a right angle core positioned within said casing in the path of said inlet opening and one of said outlet openings, means coupling said core to the water cooling system of said automobile, and air impelling means carried by said casing and designed to draw air into said casing through said inlet opening across one portion of said core and to force said air out through the outlet openings in said casing.

2. An automobile heater including a casing formed with an inlet opening and a plurality of outlet openings, a right angle core positioned within said casing in the path of said inlet opening and one of said outlet openings, means coupling said core to the water cooling system of said automobile, air impelling means carried by said casing and designed to draw air into said casing through said inlet opening across one portion of said core and to force said air out through the outlet openings in said casing, and a deflector fitting associated with said casing adjacent the outlet opening across which one portion of said core extends, said fitting serving to divide the air stream flowing from said outlet opening into a plurality of separate paths.

3. An automobile heater including a casing formed with an inlet opening and a plurality of outlet openings, a right angle core positioned within said casing in the path of said inlet opening and one of said outlet openings, means coupling said core to the water cooling system of said automobile, air impelling means carried by said casing and designed to draw air into said casing through said inlet opening across one portion of said core and to force said air out through the outlet openings in said casing, and a deflector fitting associated with said casing adjacent the outlet opening across which one portion of said core extends, said fitting serving to divide the air stream flowing from said outlet opening into a plurality of separate paths.

4. An automobile heater including a casing formed with an inlet opening and a plurality of outlet openings, a right angle core positioned within said casing in the path of said inlet opening and one of said outlet openings, means coupling said core to the water cooling system of said automobile, and air impelling means comprising a motor having a double ended shaft, fans associated with each end of said shaft, said motor and fans being so mounted within said casing that one of said fans is positioned adjacent that portion of said radiator core that extends across one of said outlet openings, and the other fan being positioned adjacent another of said outlet openings so that as said fans are rotated, air is drawn into said casing through said inlet opening and thereafter expelled through said outlet openings.

5. A heater adapted to be disposed within the body of an automobile and including a casing formed with an air inlet and with a pair of air outlet openings, a heat exchange unit disposed across said air inlet opening and whereby all air entering said heater from the body of the automobile will pass in heat transfer contact with said unit and as it enters said casing, said heat exchange unit also extending in the path of the air before it discharges through one of said outlet openings, the other outlet opening being unobstructed, motor driven air impelling means disposed with said casing comprising a plurality of impellers, said impelling means drawing air through said inlet opening, one of said impellers discharging air through the outlet opening of the casing in advance of which said heat exchange unit is disposed and the other impeller discharging air from the interior of the casing directly through the second outlet opening of the same.

6. A heater adapted to be disposed within the body of an automobile and including a casing formed with an air inlet and with a pair of air outlet openings, a heat exchange unit disposed across said air inlet opening, whereby all air entering said heater from the body of the automobile will pass in heat transfer contact with said unit and as it enters said casing, said heat exchange unit also extending in the path of the air before it discharges through one of said outlet openings, the other outlet opening being unobstructed, motor driven air impelling means disposed with said casing comprising a plurality of impellers, said impelling means drawing air through said inlet opening, one of said impellers discharging air through the outlet opening of the casing in advance of which, said heat exchange unit is disposed, the other impeller discharging air from the interior of the casing directly through the second outlet opening of the same and means providing a passage for the introduction of fresh air into the interior of said casing, said air impelling means drawing air through said passage.

JOHN M. AUFIERO.